United States Patent [19]

Gross

[11] Patent Number: 5,798,166
[45] Date of Patent: Aug. 25, 1998

[54] INSULATION FOR SLEEPING BAGS AND SIMILAR ITEMS

[75] Inventor: Brian Gross, Eugene, Oreg.

[73] Assignee: Albany International Corp., Albany, N.Y.

[21] Appl. No.: 701,772

[22] Filed: Aug. 26, 1996

[51] Int. Cl.$^6$ .................................................. A47G 9/00
[52] U.S. Cl. ...................... 428/156; 5/413 R; 428/166; 428/920
[58] Field of Search .................................. 428/116, 920, 428/156, 166; 5/413 R

[56] References Cited

U.S. PATENT DOCUMENTS

| | | |
|---|---|---|
| 3,707,009 | 12/1972 | Wagner . |
| 3,900,648 | 8/1975 | Smith . |
| 4,090,269 | 5/1978 | Hunt . |
| 4,843,664 | 7/1989 | Farnworth . |
| 4,910,055 | 3/1990 | Wigutow . |
| 4,985,951 | 1/1991 | Lacotte . |
| 5,027,458 | 7/1991 | Osczevski . |
| 5,033,135 | 7/1991 | Creek . |
| 5,274,846 | 1/1994 | Kolsky . |
| 5,670,238 | 9/1997 | Earl et al. . |

FOREIGN PATENT DOCUMENTS

| | | |
|---|---|---|
| 9210578.5 | 12/1992 | Germany . |
| 9208370.6 | 9/1993 | Germany . |
| 4231969C2 | 8/1994 | Germany . |

*Primary Examiner*—James J. Bell
*Attorney, Agent, or Firm*—Kane, Dalsimer, Sullivan, Kurucz, Levy, Eisele and Richard, LLP

[57] ABSTRACT

The insulating fiber includes regular synthetic fiber batting which is additionally shaped with ridges and/or peaks to allow the use of the inherent mechanical strength of the fiber to create large or macro-scale pockets of dead air space without a proportional increase in weight.

6 Claims, 1 Drawing Sheet

INSULATION FOR SLEEPING BAGS AND SIMILAR ITEMS

BACKGROUND OF THE INVENTION

1. Field of the Invention

The invention pertains to an insulation for sleeping bags or similar items, creating dead-air space on a macro level by relying on the inherent mechanical strength of composite synthetic fibers. This results in increased loft with minimal increase in weight.

2. Description of the Prior Art

In the prior art, it is well-known to create loft on a micro basis by heat setting of the insulating fibers. However, this has a limited ability to increase loft and a limited ability to increase the insulation provided by the fibers without a corresponding increase in weight.

OBJECTS AND SUMMARY OF THE INVENTION

It is therefore an object of this invention to provide an insulating fiber with increased insulating value.

It is therefore a further object of this invention to provide an insulating fiber with increased loft, particularly on a macro level.

It is therefore final object of this invention to provide an insulating fiber which achieves the above objects with little or no increase in weight.

These and other objects are attained by making use of the inherent mechanical strength of the composite synthetic fibers of an insulating material to create loft on a macro level. By using manufacturing techniques to create dead air space (such as, for example, incorporating ridges, peaks and/or cut outs), layers of synthetic fiber will have more loft with less weight, particularly when compared to the prior art method of simply providing additional uniform layer of material. This invention, however, can use uniform flat layers of fabric sandwiched between the macro loft layers or can use successive layers of the macro loft layers.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
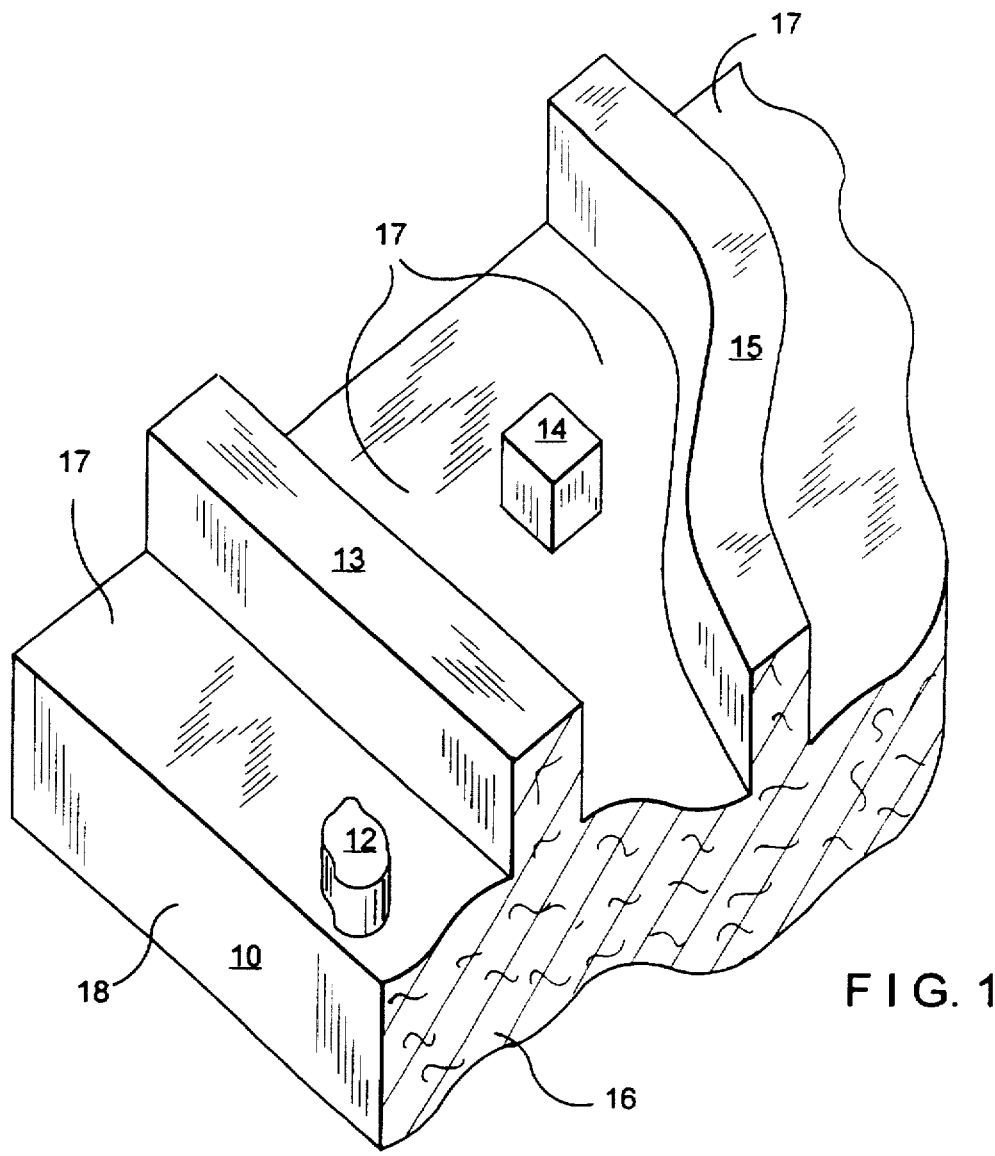
FIG. 1 is a perspective illustrative view of a fabric layer with macro loft of the present invention.
Figure 2:
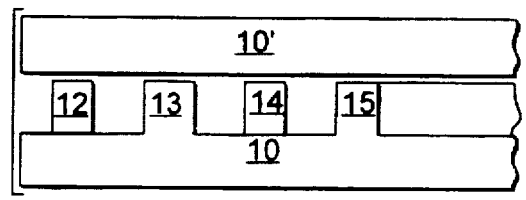
FIG. 2 is a cross-sectional view of a fabric layer with macro loft of the present invention.

Referring now to the drawings in detail wherein like numerals refer to like elements throughout the several views, one sees that FIG. 1 illustrates the batting 10, typically synthetic, of the insulating fiber of the present invention. Batting 10 includes a lower uniform section 18 with uniform integral ridges 13, randomly placed oddly shaped integral ridges 15, oddly shaped integral peaks 12, and/or integral uniform section peaks 14 extending upwardly (in the perspective of FIG. 1) therefrom thereby increasing loft without a proportional increase in density. The integral ridges 13, 15 and/or peaks 12, 14 may be incorporated onto the batting 10 in both a uniform and/or random manner to maximize the loft-to-weight ratio while minimizing manufacturing costs. The integral ridges 13, 15 and/or peaks 12, 14 are provided to separate the uniform batts thereby creating macro dead air space 17. Micro dead air space 16 is further provided between the threads of the fibers within bat 10 and the ridges 13, 15 and/or peaks 12, 14. As shown in FIG. 2, batting 10' is placed above the integral ridges 13, 15 and/or peaks 12, 14. Batting 10' can be the lower portion of a fabric layer with similar upwardly extending integral ridges and/or peaks or can be a uniform fabric layer without such integral ridges and/or peaks.

The height and width of the ridges 13, 15 and peaks 12, 14 is typically 0.5 to 2.0 inches and typically results in a weight add-on of ten to fifty percent, although these numbers are not limiting to the invention.

Figure 3:
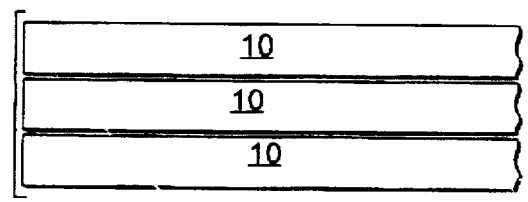
FIG. 3 is a cross-sectional view of several prior art fabric layers.

FIG. 3 illustrates a conventional prior art structure of successive uniform layers of batting. The structures in FIGS. 2 and 3 provide comparable insulation, but the structure of FIG. 3 is typically sixty percent heavier than the structure in FIG. 2.

Referring back to FIGS. 1 and 2, the integral peaks 12, 14 and ridges 13, 15 make use of the inherent mechanical strength of the combined fiber. It is therefore possible to use a wide range of synthetic fibers, including but not limited to chopped, continuous, hollow or solid section, etc. The limiting requirement for the combined fiber is sufficient mechanical resilience to support the various peaks and ridges allowing rebound after compression of body weight (such as when used as a sleeping bag) or packing.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. An insulating material comprising:
   a base fabric of uniform thickness,
   structures integral with said base fabric extending upward from said base fabric which support a subsequent layer of fabric while creating macro air spaces between said structures, said base fabric and said subsequent layer of fabric.

2. The insulating material of claim 1 wherein said structures include oddly shaped peaks.

3. The insulating material of claim 1 wherein said structures include uniformly shaped peaks.

4. The insulating material of claim 1 wherein said structures include uniform section ridges.

5. The insulating material of claim 1 wherein said structures include randomly placed oddly shaped ridges.

6. The insulating material of claim 1 wherein said base fabric and said structures include micro air spaces therewithin.

* * * * *